United States Patent [19]

Miura et al.

[11] Patent Number: 4,937,801
[45] Date of Patent: Jun. 26, 1990

[54] MAGNETO-OPTICAL RECORDING AND REPRODUCING APPARATUS WITH MAGNETIC FIELD CONTROLLER

[75] Inventors: Michio Miura; Kichizaemon Okazaki, both of Yokohama; Yasuo Otsuka, Kamakura, all of Japan

[73] Assignee: Hitachi, Ltd., Tokyo, Japan

[21] Appl. No.: 109,314

[22] Filed: Oct. 19, 1987

[30] Foreign Application Priority Data

Oct. 17, 1986 [JP] Japan .................. 61-245351

[51] Int. Cl.⁵ .................. G11B 13/14; G11B 11/12
[52] U.S. Cl. .................. 369/13; 360/114; 360/45
[58] Field of Search .......... 369/13, 45; 360/114, 360/59; 365/122; 250/201, 201 DF

[56] References Cited

U.S. PATENT DOCUMENTS 4,280,215  7/1981  Okano .................. 369/45
4,410,969 10/1983  Maeda .................. 369/45
4,725,721  2/1988  Nakamura et al. ..... 369/45

FOREIGN PATENT DOCUMENTS 60-00630  1/1985  Japan .................. 369/13
60-209944 10/1985  Japan .................. 369/13

Primary Examiner—Alan Faber
Assistant Examiner—Hoa Nguyen
Attorney, Agent, or Firm—Antonelli, Terry, Stout & Kraus

[57] ABSTRACT

In a magneto-optical recording and reproducing apparatus for effecting the recording of information, etc. by irradiating a magnetic recording layer of a magneto-optical disk with a laser beam focued by an objective lens and applying a magnetic field to a portion of the magnetic recording layer irradiated with the laser beam, the strength of the magnetic field is controlled by a signal to drive the objective lens for focusing the laser beam onto the magnetic recording layer.

13 Claims, 8 Drawing Sheets

INTERVAL (mm) BETWEEN END FACE
OF ELECTROMAGNETIC COIL AND
MAGNETIC RECORDING LAYER

MAGNETO-OPTICAL RECORDING AND REPRODUCING APPARATUS WITH MAGNETIC FIELD CONTROLLER

BACKGROUND OF THE INVENTION

The present invention relates to a magneto-optical recording and reproducing apparatus in which the recording, reproduction and erasure of information are made by applying a laser beam and a magnetic field to a magnetic recording layer film provided on a disk-like substrate.

A recording operation in a generally known magneto-optical recording and reproducing apparatus includes converging or focusing a laser beam onto a magnetic recording layer formed on a disk substrate so that a minute region of the magnetic recording layer irradiated with the laser beam is heated up to the vicinity of a Curie temperature. An external magnetic field from a magnetic field generating means is applied to the heated minute region to turn the magnetization of the minute region to a direction of the external magnetic field, thereby effecting the recording of a signal. Upon erasure, on the other hand, the recorded signal is erased by carrying out a similar operation to the recording operation while making the direction of the external magnetic field reverse to that at the time of recording.

As the magnetic field generating means, a permanent magnet or an electromagnetic coil is generally used. The strength of the magnetic field necessary for the recording or erasure of a signal is in the order of 300 to 500 Oe.

When the permanent magnet is used as the magnetic field generating means, it is relatively easy to obtain the above-mentioned magnetic field strength. However, the inversion of the magnetic field cannot be rapidly made since it must be carried out by changing the direction of the permanent magnet by use of a mechanical means. Therefore, the apparatus using the permanent magnet has a drawback that it cannot be used for applications in which the recording and erasure are performed at a high speed (for example, over writable recording).

On the other hand, when the electromagnetic coil is used as the magnetic field generating means, the inversion of the magnetic field can be easily made. In order that the strong magnetic field of 300 to 500 Oe is applied to a minute region on the disk substrate by the electromagnetic coil, it is necessary to keep the electromagnetic coil near to the magnetic recording layer as much as possible. However, the disk rotates with a runout in its thickness direction. (The runout in the thickness direction will be hereinafter referred to generally as axial runout.) Accordingly, it is impossible to allow the electromagnetic coil to come near the magnetic recording layer with a distance smaller than the maximum amount of axial runout. Also, a distance between the electromagnetic coil and the magnetic recording layer varies during rotation of the disk because of the axial runout. Therefore, the magnetic field strength at the magnetic recording layer changes and hence a stable signal recording or erasure operation cannot be expected. Particularly, in the case where the disk substrate is made of plastics, the abovementioned problem is severe since the amount of axial runout of the disk substrate may come up to $\pm 0.5 - \pm 1$ mm.

A proposal for solving this problem has been disclosed by, for example, JP-A-60-209944. According to the disclosed proposal, a laser beam used for the operation of recording, reproduction and erasure of information transmits through a magnetic recording layer and the beam transmitted through the magnetic recording layer is used as a light for detection of the amount of deviation in position of an electromagnetic coil. The positional deviation of the electromagnetic coil is detected on the basis of the transmitted beam by a system exclusively used for the purpose of error detection including a convex lens, photo-electric converter, etc. The detected signal representative of the positional deviation is supplied to a driving means to correct the deviation in position of the electromagnetic coil with respect to the magnetic recording layer.

In the above-mentioned prior art technique, that portion of the laser beam used for the recording, reproduction and erasure of information which transmits through the magnetic recording layer of the disk is used for detecting the deviation in position of the electromagnetic coil in the disk thickness direction with respect to the magnetic recording layer. Therefore, this prior art technique has a problem that it cannot be applied to a disk having a reflective magnetic recording layer which is impermeable to a laser beam. Further, the system exclusively used for the purpose of error detection including the convex lens, photo-electric converter, etc. is required as a means for detecting the positional deviation of the electromagnetic coil. Therefore, there is a problem that the construction is complicated.

SUMMARY OF THE INVENTION

An object of the present invention is to provide an apparatus in which the strength of a magnetic field at the position of a magnetic recording layer on a magneto-optical disk can be controlled to a predetermined value by use of a simple construction.

Another object of the present invention is to provide an apparatus which can be used even if a magnetic recording layer on an optical magnetic disk is reflective.

The present invention is directed to a magneto-optical recording and reproducing apparatus comprising an objective lens for converging a laser beam onto a magnetic recording layer of a magneto-optical disk, objective lens driving means for driving the objective lens so that the objective lens follows an axial runout of the magneto-optical disk, and an electromagnetic coil for applying a magnetic field to the magnetic recording layer of the magneto-optical disk. According to one aspect of the present invention, a current supplied to the electromagnetic coil is controlled by an objective lens driving signal of the objective lens driving means so as to keep constant the strength of the magnetic field applied to the magnetic recording layer of the magneto-optical disk, thereby achieving the above-mentioned object of the invention.

According to another aspect of the present invention, the electromagnetic coil is mounted to be movable in the direction of thickness of the magneto-optical disk and the position of the electromagnetic coil is controlled so as to keep constant the strength of the magnetic field in the magnetic recording layer of the magneto-optical disk, thereby achieving the abovementioned object of the invention.

DESCRIPTION OF THE PREFERRED EMBODIMENTS

Figure 1:
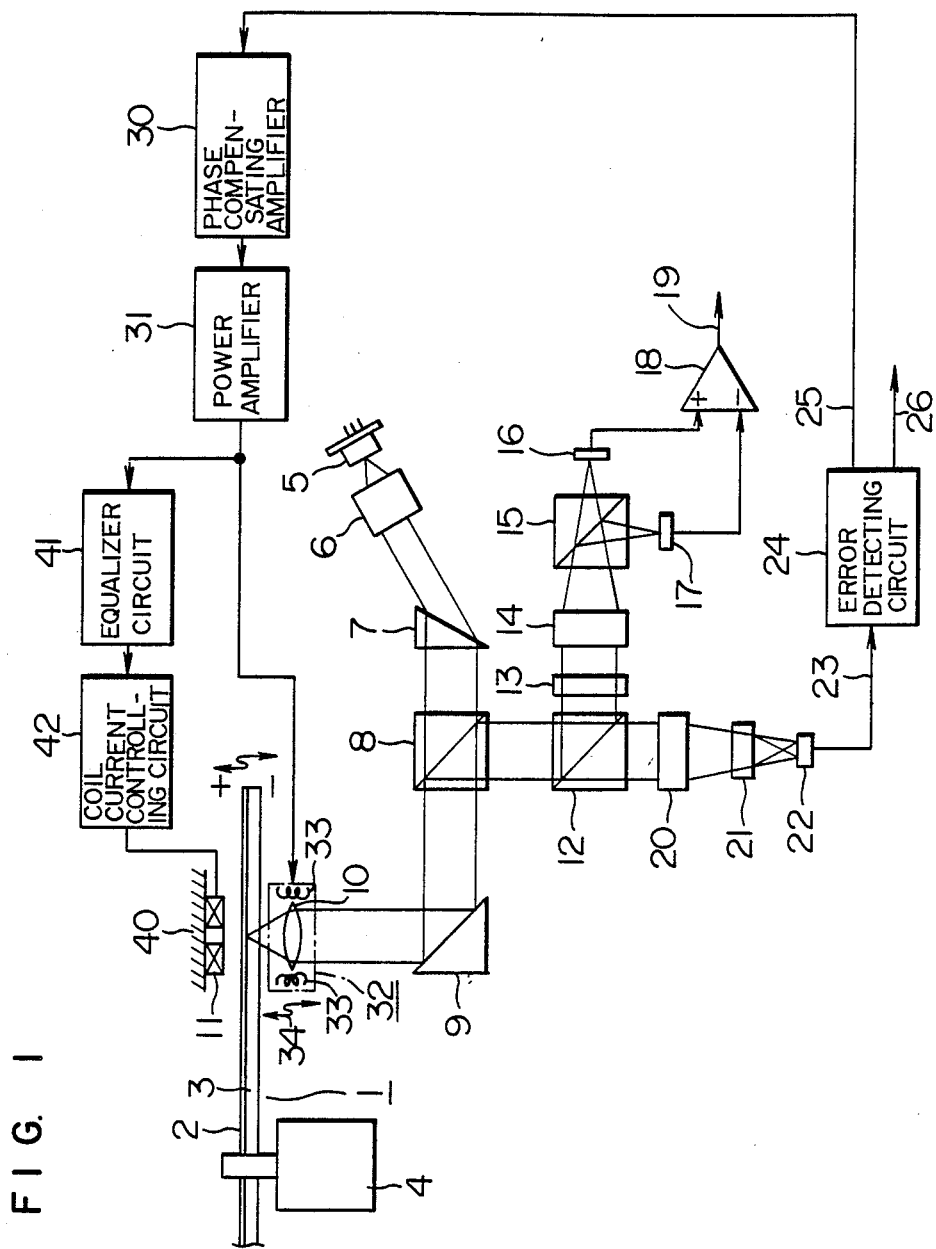
FIG. 1 shows the construction of an embodiment of a typical magneto-optical recording and reproducing apparatus according to the present invention.

The construction of an embodiment of a magneto-optical recording and reproducing apparatus according to the present invention is shown in FIG. 1. The operations of recording, reproduction and erasure of information in a general magneto-optical recording and reproducing apparatus will now be explained by virtue of FIG. 1.

A magneto-optical disk 1 includes a light reflective magnetic recording layer 2 and a light permeable substrate 3. The magneto-optical disk 1 is rotatably mounted to a motor 4. A semiconductor laser 5 is a source of linearly polarized light. Explanation will be first made of the information recording operation. A laser beam emitted from the semiconductor laser 5 is collimated by a collimator lens 6 and then shaped by a beam shaping prism 7 into a laser beam having a substantially circular distribution of intensity. Thereafter, the laser beam reaches a first polarizer 8 as a beam splitter in which a part of the incoming laser beam is reflected and the remaining part thereof passes. The laser beam passed through the first polarizer 8 is reflected by a mirror 9 and converged by an objective lens 10 to irradiate the magnetic recording layer 2 in the form of a minute spot. A minute region of the magnetic recording layer 2 irradiated with the laser beam spot is locally heated up to the vicinity of a Curie temperature. At this time, a current is supplied to an electromagnetic coil 11 to generate a magnetic field in the heated minute region of the magnetic recording layer 2. As a result, the minute region is magnetized to a direction of the external magnetic field (generated by the electromagnetic coil 11). In this manner, information is recorded into the minute region.

Next, the information reproduction operation will be explained. Like the case of the information recording operation, a laser beam is emitted from the semiconductor laser 5 and passes through the collimator lens 6, beam shaping prism 7, first polarizer 8, mirror 9 and objective lens 10 to irradiate the magnetic recording layer 2. The laser beam irradiating the magnetic recording layer 2 is reflected with a polarizeration plane changed by a well-known Kerr effect. The reflected laser beam is transmitted through the substrate 3 and then the objective lens 10. When the laser beam passes through the objective lens 10, it returns to a collimated beam which is in turn reflected by the mirror 9 to enter the first polarizer 8. In the first polarizer 8, a portion (S-polarized light in the present embodiment) of the incident beam including a signal component and having a polarization direction resulting from the Kerr effect is almost reflected while the other portion thereof having a polarization component (P-polarized light in the present embodiment) having a phase different from the S-polarized light by 90° is partially reflected and partially passes. The laser beam reflected by the first polarizer 8 is directed to a second polarizer 12 which is a beam splitter. The S-polarization component of the laser beam incident upon the second polarizer 12 is almost reflected while the P-polarization component thereof is partially reflected and partially passes.

The laser beam reflected by the second polarizer 12 including an information component recorded in the magnetic recording layer 2 passes through a wavelength ($\lambda$)/2 plate 13 and is then converged by a convex lens 14. Thereafter, the laser beam enters an analyzer (polarization beam splitter) 15 which in turn splits the beam into two parts, i.e. one directed to a first light detector 16 and the other directed to a second light detector 17. The laser beams incident to the first and second light detectors 16 and 17 are converted into electric signals, respectively. These electric signals are inputted to a differential amplifier 18 which in turn delivers a reproduction signal 19. In this manner, the information recorded in the magnetic recording layer 2 of the magneto-optical disk 1 is reproduced.

The operation of erasure of information recorded in the magnetic recording layer 2 is as follows. Like the information recording operation, a laser beam emitted from the semiconductor laser 5 passes through the collimator lens 6, beam shaping prism 7, first polarizer 8, mirror 9 and objective lens 10 to irradiate the magnetic recording layer 2. On the other hand, a current having a polarity reverse to that at the time of recording is supplied to the electromagnetic coil 11 so that a magnetic field having a direction reverse to that at the time of recording is generated in a minute region of the magnetic recording layer 2 irradiated with the laser beam. As a result, the minute region of the magnetic recording layer 2 is magnetized to take the original state before the information has been recorded. In this way, the information recorded in the magnetic recording layer 2 is erased.

Now, an operation for detecting a distance between the objective lens 10 and the magneto-optical disk 1 will be explained.

At the time of recording, reproduction or erasure of information, a laser beam is emitted from the semiconductor laser 5 and passes through the collimator lens 6, beam shaping prism 7, first polarizer 8, mirror 9 and objective lens 10 to irradiate the magnetic recording layer 2, as has already been mentioned. When the laser beam reflected by the magnetic recording layer 2 passes through the objective lens 10 again, it returns to a collimated beam which is in turn reflected by the mirror 9 to enter the first polarizer 8. A part of the laser beam incident upon the first polarizer transmits therethrough while the remaining part thereof is reflected therefrom. The reflected beam is directed to the second polarizer 12. A part of the laser beam incident upon the second polarizer 12 passes therethrough while the remaining part thereof is reflected therefrom. The beam passed through the second polarizer 12 is converged by a convex lens 20 and enters a light detector 22 for servo signal through a cylindrical lens 21. The light detector 22 is divided into a plurality of light receiving elements, depending on a servo error detecting scheme. In the present embodiment, the light detector 22 includes four light receiving elements. When a distance between the objective lens 10 and the magneto-optical disk 1 is a predetermined value, the laser beam passed through the objective lens 10 is focused on the magnetic recording layer 2 and the focused beam is reflected therefrom. The laser beam incident onto the light detector 22 in that case assumes a circular spot form on the light detector 22. Thereafter if the magneto-optical disk 1 encounters a positional deviation in a direction of thickness thereof and hence a focus error takes place, the laser beam passed through the objective lens 10 is not focused on the magnetic recording layer 2 and is reflected therefrom in an out of-focus state. The laser beam incident upon the light detector 22 in such a case takes an elliptical spot form on the light detector 22. The direction of a major axis of the elliptical spot is different depending on the sense of the thickness direction of the magneto-optical disk 1 in which sense the focus error takes place. The direction of the major axis of the elliptical spot and hence the positional deviation of the magneto-optical disk 1 in the thickness direction can be detected by using the four light receiving (quadrant) elements as the light detector 22, as mentioned above, so as to detect the amounts of laser beam incident upon the respective light receiving elements. Output signals 23 of the light detector 22 including the four light receiving elements are applied to an error detecting circuit 24. The error detecting circuit 24 produces a focus error signal 25 representing a positional deviation of the magneto-optical disk 1 in its thickness direction with respect to the objective lens 10 and a tracking error signal 26 representing a positional deviation of the magneto-optical disk 1 in its radius direction.

The objective lens 10 is mounted to be movable in a direction indicated by arrow 34 (i.e. the thickness direction of the magneto-optical disk 1). The objective lens 10 is driven by an objective lens driving device 32 including a driving coil 33 to which a current is supplied.

The electromagnetic coil 11 is fixedly mounted to a stationary member 40 the position of which does not change in the thickness direction of the magneto-optical disk 1. The electromagnetic coil 11 generates a magnetic field having its strength proportional to an externally supplied current.

Next, explanation will be made in conjunction with an operation for causing the objective lens 10 to follow an axial runout of the magneto-optical disk 1.

The magneto-optical disk 1 has a distortion such as an axial runout. Particularly, when the disk substrate is made of plastics, the disk rotates with the axial runout coming up to ±0.5–±1 mm. Therefore, it is necessary to drive the objective lens 10 so that a focal point of the lens is always positioned on the magnetic recording layer irrespective of the disk axial runout. As has already been mentioned, the error detecting circuit 24 outputs the signal 25 representing a focus error of the objective lens 10 with respect to the magneto-optical disk 1. The focus error signal 25 is applied to a phase compensating amplifier 30 in which the focus error signal is phase-compensated and amplified. An output signal of the phase compensating amplifier 30 is applied to a power amplifier 31. An output signal of the power amplifier 31 is supplied to the driving coil 33 in the objective lens driving device 32. As a result, the objective lens 10 is driven in a direction of arrow 34, thereby correcting the positional error of the objective lens 10 associated with the axial runout of the magneto-optical disk 1.

Now, explanation will be made of an operation for control of the strength of a magnetic field.

When the recording of information in the magnetic recording layer 2 or the erasure of information therefrom is made, the strength of a magnetic field at the magnetic recording layer 2 should be controlled so that it is always kept at a predetermined value. When the magneto-optical disk 1 encounters its axial runout, an interval between the electromagnetic coil 11 and the magnetic recording layer 2 changes. The strength of the magnetic field at the magnetic recording layer 2 correspondingly changes if a current supplied to the electromagnetic coil 11 is constant. According to the embodiment of the present invention, the supply current to the electromagnetic coil 11 is changed in accordance with the amount of axial runout of the magneto-optical disk 1 so as to keep the magnetic field strength at the magnetic recording layer 2 at a predetermined value. In the present embodiment, the output signal of the power amplifier 31 is applied to an equalizer circuit 41 which converts the driving current of the objective lens driving device 32 into an electric signal representing a displacement of the objective lens 10 when it is driven. The equalizer circuit 41 has a characteristic of a secondary lag element identical to the frequency characteristic of the objective lens driving device 32. Since the objective lens 10 is driven so that it is displaced following the axial runout of the magneto-optical disk 1, the amount of axial runout of the magneto-optical disk 1 can be known from the displacement of the objective lens 10. Namely, an output signal of the equalizer circuit 41 represents the amount of axial runout of the magneto-optical disk 1.

The output signal of the equalizer circuit 41 representing the amount of axial runout of the magneto-optical disk 1 is applied to a coil current controlling circuit 42. The coil current controlling circuit 42 effects the supply of a current to the electromagnetic coil 11 on the basis of the signal representative of the axial runout amount (or the output signal of the equalizer circuit 41), thereby controlling the strength of a magnetic field to be applied to the magnetic recording layer 2 by the electromagnetic coil 11 so that the strength of the magnetic field in the magnetic recording layer 2 is always kept at a predetermined value.

Figure 2:
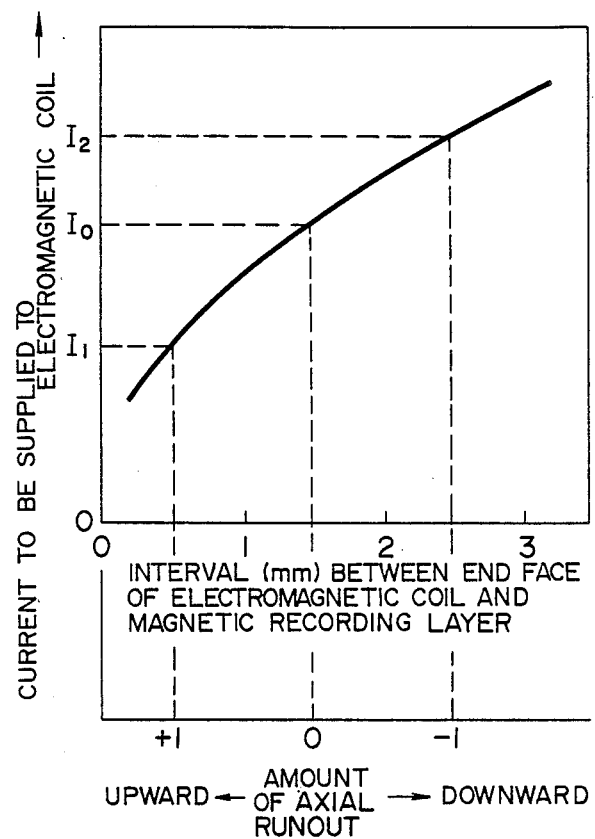
FIG. 2 is a view for explaining the operation of a coil current controlling circuit used in the embodiment shown in FIG. 1.

Next, an operation of the coil current controlling circuit 42 will be explained. FIG. 2 is a view for explaining the operation of the coil current controlling circuit 42. FIG. 2 shows a current to be supplied to the electromagnetic coil 11 in order that the strength of a magnetic field applied by the electromagnetic coil 11 has a constant value at the magnetic recording layer 2 when an interval between an end face of the electromagnetic coil 11 and the magnetic recording layer 2 changes due to an axial runout of the magneto-optical disk 1. In a graph shown in FIG. 2, the interval between the electromagnetic coil 11 and the magnetic recording layer 2 is 1.5 mm when the amount of axial runout of the magneto-optical disk 1 is zero. The amount of axial runout of the magneto-optical disk 1 is shown to be positive when the magneto-optical disk 1 deviates upward in FIG. 1 and negative when it deviates downward.

As shown in FIG. 2, when the amount of axial runout of the magneto-optical disk 1 is zero, the coil current controlling circuit 42 supplies a current of $I_0$ to the electromagnetic coil 11. When the magneto-optical disk 1 deviates upward by 1 mm due to its axial runout, the coil current controlling circuit 42 supplies a current of $I_1$ smaller than $I_0$ to the electromagnetic coil 11. On the other hand, when the magneto-optical disk 1 deviates downward by 1 mm due to its axial runout, a current $I_2$ larger than $I_0$ is supplied to the electromagnetic coil 11 by the coil current controlling circuit 42. As mentioned above, the magnetic field generated by the electromagnetic coil 11 is kept constant at the magnetic recording layer 2 even if the magneto-optical disk 1 encounters an axial runout in its thickness direction.

According to the described embodiment, the magnetic field at the magnetic recording layer 2 can be kept constant by changing a current supplied to the electromagnetic coil 11. Further, since it is not necessary to move the electromagnetic coil 11 in the thickness direction of the magneto-optical disk, the apparatus can be constructed with a simple structure. Also, no device to be exclusively used for the purpose of detection of a positional deviation of the electromagnetic coil 11 is necessary. Furthermore, it is not necessary that the magnetic recording layer 2 is semi-transmissible. The embodiment shown in FIG. 1 can be applied to both the case where the magnetic recording layer 2 is a semi-transmissible layer and the case where it is a reflective layer.

It should be noted that the construction of an optical system including the lenses, prism and polarizers or the construction of the focus error detecting system, as used in the above-mentioned embodiment, is shown as an example but another construction can be used so long as the focus error signal is obtained.

Figure 3:
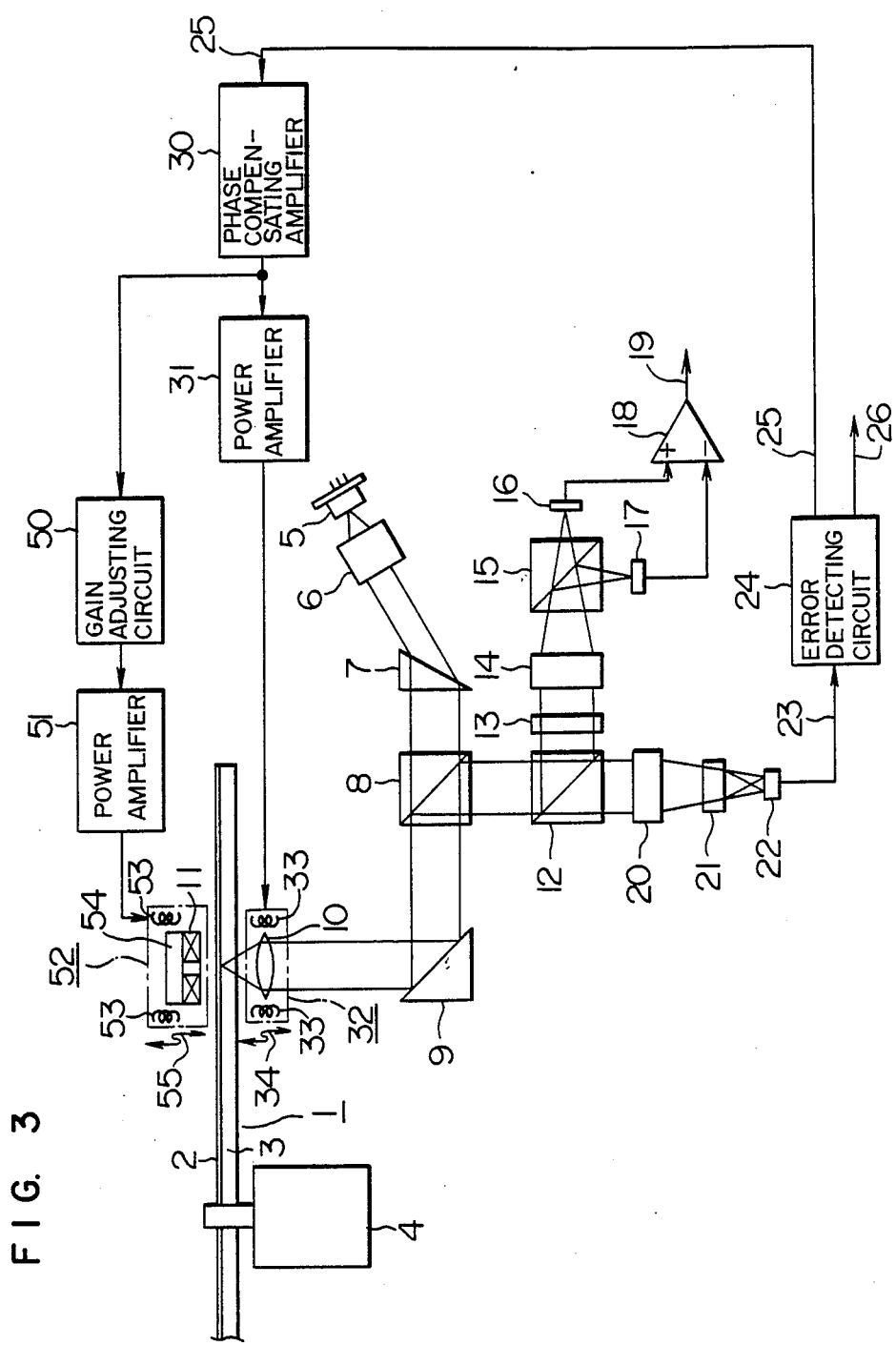
FIG. 3 shows a construction of another embodiment of a magneto-optical recording and reproducing apparatus according to the present invention.

FIG. 3 shows another embodiment of the present invention. In the embodiment shown in FIG. 3, a radiation optical system extending from the semiconductor laser 5 to the objective lens 10, a reproduction system extending from the objective lens 10 to the light detectors 16 and 17, and a focus error detecting system extending from the objective lens 10 to the light detector 22 and the error detecting circuit 24 are similar to those in FIG. 1. Namely, like the embodiment shown in FIG. 1, the objective lens 10 in FIG. 3 is driven in the direction of arrow 34 by the objective lens driving device 32, following an axial runout of the magneto-optical disk 1. Since the operations of recording, reproduction and erasure of a signal and the manner of detection of a focus error are the same as those in the embodiment of FIG. 1, explanation will be omitted. A focus error signal 25 shown in FIG. 3 which is the same as the focus error signal 25 shown in FIG. 1, is an output signal from the error detecting circuit 24. The phase compensating amplifier 30 and power amplifier 31 are similar to those shown in FIG. 1.

In the embodiment shown in FIG. 3, the electromagnetic coil 11 is mounted to a movable member 54 which is driven by a coil position driving device 52. With such a construction, a magnetic field in the magnetic recording layer 2 is kept constant.

Figure 4:
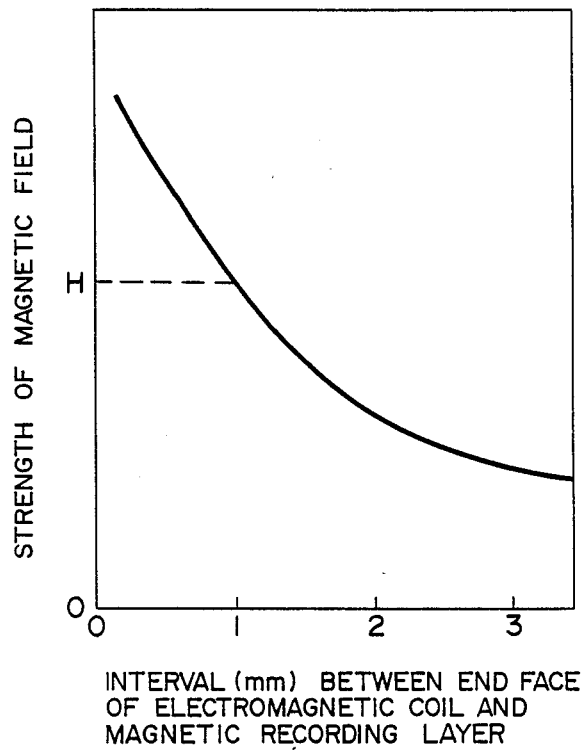
FIG. 4 shows the magnetic field strength characteristic of an electromagnetic coil used in the embodiment shown in FIG. 3.

The strength of a magnetic field applied to the magnetic recording layer 2 by the electromagnetic coil 11 has such a characteristic as shown in FIG. 4. FIG. 4 shows a change in strength of the magnetic field at a position of the magnetic recording layer 2 with respect to an interval between an end face of the electromagnetic coil 11 and the magnetic recording layer 2 in the case where a current supplied to the electromagnetic coil 11 is constant. As shown in FIG. 4, the magnetic field strength at the position of the magnetic recording layer 2 decreases as the interval between the end face of the electromagnetic coil 11 and the magnetic recording layer 2 increases. Accordingly, even if the magneto-optical disk 1 encounters its axial runout, the magnetic field at the position of the magnetic recording layer 2 can be made constant by driving the electromagnetic coil 11 so that the interval between the magnetic recording layer 2 and the electromagnetic coil 11 is kept constant.

The amount of movement of the electromagnetic coil 11 necessary for compensation of the axial runout of the magneto-optical disk 1 is equal to the abovementioned amount of movement of the objective lens 10 for correction of its positional deviation since the magnetic recording layer 2 is very thin (several hundred to several thousand nanometers) and is uniform in thickness. Therefore, a control for correction of the positional deviation of the electromagnetic coil 11 with respect to the magneto-optical disk 1 can be made by means of the driving signal of the objective lens driving deivce 32.

In the embodiment shown in FIG. 3, the output signal of the phase compensating circuit 30 is applied to a gain adjusting circuit 50. An output signal of the gain adjusting circuit 50 is applied to a power amplifier 51 and amplified therein. An output signal of the power amplifier 51 is supplied to a driving coil 53 of the coil position driving device 52 to drive the electromagnetic coil 11 in a direction of arrow 55. Namely, the drive direction or displacement direction of the electromagnetic coil 11 is the same as that of the objective lens 10. For example, when the objective lens 10 is driven upward, the electromagnetic coil 11 is also driven upward. The amount of displacement of the electromagnetic coil 11 is adjusted by the gain adjusting circuit 50 so that it is made equal to the amount of displacement of the objective lens 10. The gain adjusting circuit 50 is provided for making the displacement amount of the electromagnetic coil 11 and that of the objective lens 10 equal to each other since the sensitivity (i.e. the output of displacement amount to the input current) of the coil position driving device 52 is generally different from that of the objective lens driving device 32 even if the resonance frequency and damping ratio of the coil position driving device 52 is the same as those of the objective lens driving device 32. In the present embodiment, the resonance frequency and damping ratio of the coil position driving device 52 is selected to coincide with those of the objective lens driving device 32.

It is required that the objective lens 10 follows the axial runout of the magneto-optical disk 1 with a precision which is in the order of ±1 μm. For the electromagnetic coil 11, on the other hand, no practical problem takes place if the electromagnetic coil 11 follows the axial runout of the magneto-optical disk 1 with a precision which is in the order of ±50–100 μm. A variation in strength of the magnetic field is sufficiently small even with such a precision. Accordingly, a sufficient precision can be obtained by an open loop control of the electromagnetic coil 11 as in the present embodiment.

As has been mentioned above, according to the embodiment of FIG. 3, a control for correction of the positional deviation of the electromagnetic coil 11 associated with the axial runout of the magneto-optical disk 1 is made by means of the driving signal of the objective lens driving device 32. Therefore, there is required no system to be exclusively used for the purpose of detection of the positional deviation of the electromagnetic coil 11 though such a system was employed in the conventional apparatus. In other words, means for applying a magnetic field with a predetermined value to the magnetic recording layer 2 can be provided with a sample construction. Also, it is not necessary that the magnetic recording layer 2 is transmissible as in the conventional apparatus. The embodiment of FIG. 3 is applicable to even the case where the magnetic recording layer 2 is reflective.

Figure 7:
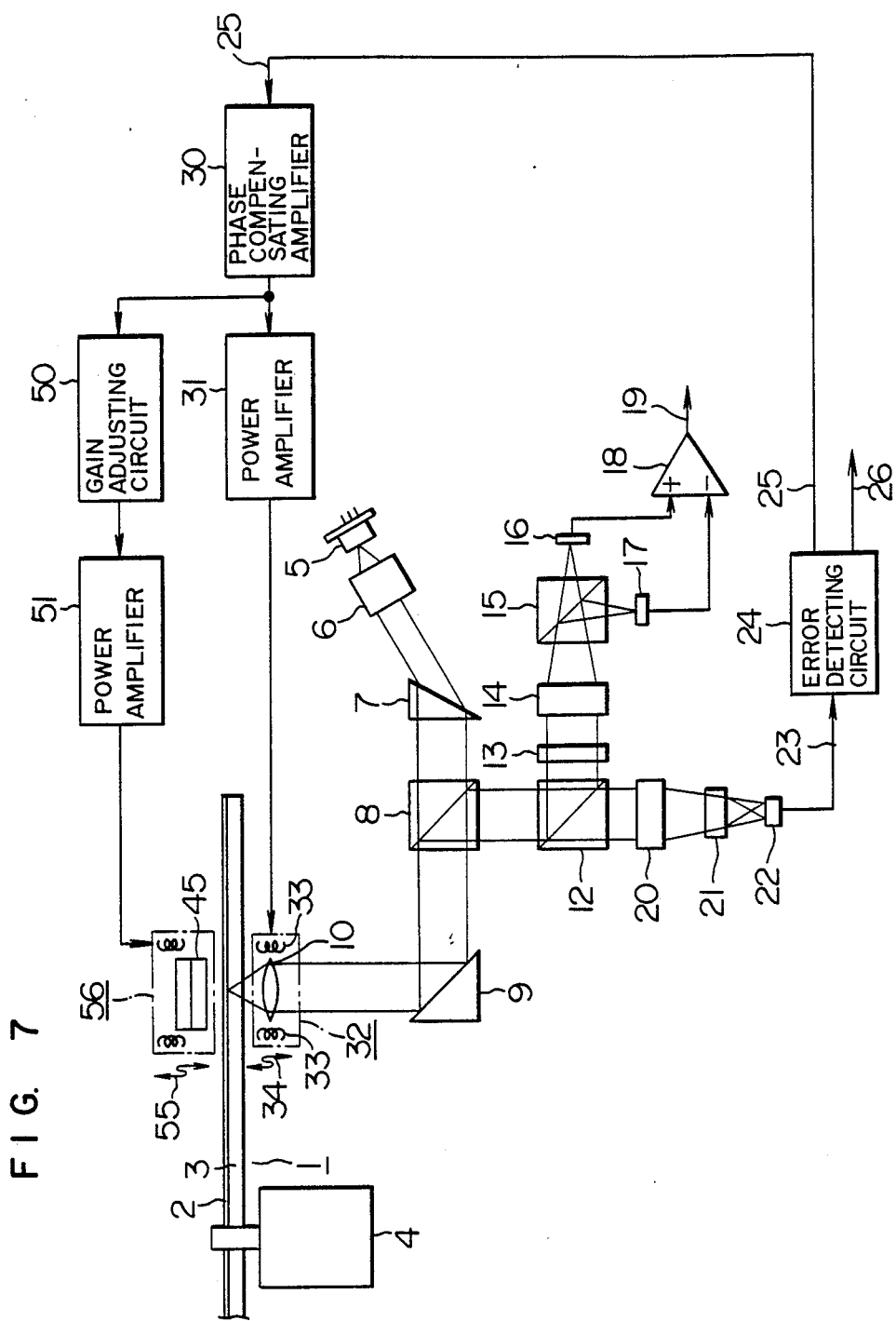
FIG. 7 shows a still further embodiment of the present invention.

Though the embodiment of FIG. 3 has employed a structure in which a magnetic field is generated by the electromagnetic coil 11, another structure can be employed in which a magnetic field is generated by a permanent magnet in place of the electromagnetic coil 11. FIG. 7 shows an embodiment in which a permanent magnet 45 is used in place of the electromagnetic coil 11. The magnet 45 is driven by a magnet position driving device in a direction of arrow 55 so as to follow an axial runout of the magneto-optical disk 1. The embodiment of FIG. 7 having such a construction can provide a similar effect to the embodiment of FIG. 3. The construction in the embodiment of FIG. 7 other than the above-mentioned construction is the same as that in the embodiment of FIG. 3. Therefore, further explanation will be omitted.

Figure 5:
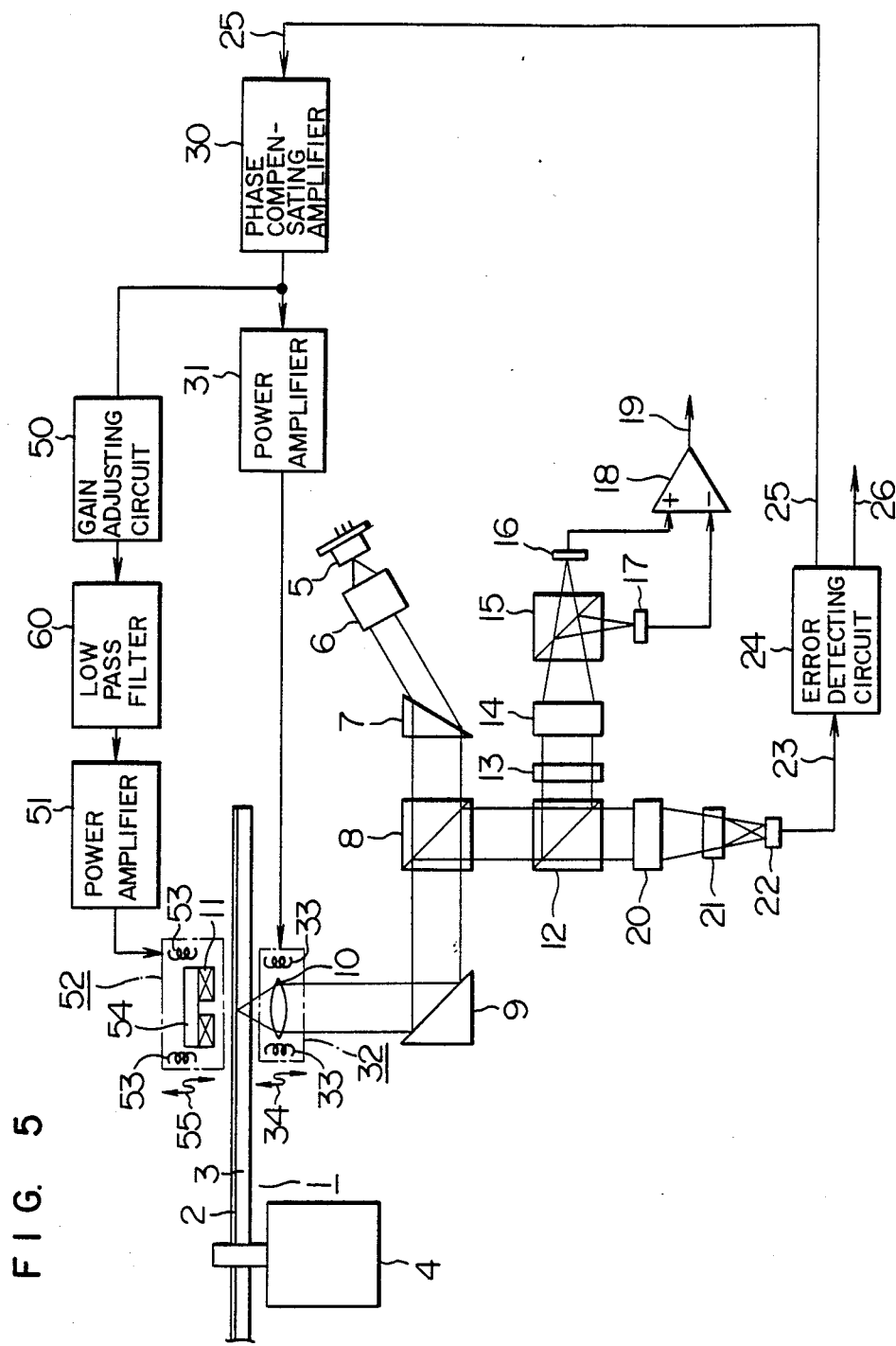
FIG. 5 shows a construction of a further embodiment of a magneto-optical recording and reproducing apparatus according to the present invention.

FIG. 5 shows a further embodiment of the present invention. Like the embodiment of FIG. 3, an optical system and focus error detecting circuit in the embodiment of FIG. 5 including the semiconductor laser 5, lenses, prism, polarizers, light detectors and error detecting circuit 24 are similar to those in the embodiment of FIG. 1. Therefore, the operations of recording, reproduction and erasure of a signal and the manner of detection of a focus error are the same as those in the embodiment of FIG. 1. Accordingly, explanation will not be repeated.

In the embodiment shown in FIG. 5, a low pass filter 60 is interposed between the gain adjusting circuit 50 and the power amplifier 51. The other construction is the same as the embodiment of FIG. 3.

In operation, the objective lens 10 is driven in a direction of arrow 34 so as to follow the axial runout of the magneto-optical disk 1, like the embodiment shown in FIG. 3. An output signal of the phase compensating amplifier 30 is applied to the gain adjusting circuit 50, like the embodiment shown in FIG. 3. An output signal of the gain adjusting circuit 50 is applied to the low pass filter 60. In the low pass filter 60, a high frequency component of the input signal is cut off while a low frequency component thereof is passed therethrough. An output signal of the low pass filter 60 is power-amplified by the power amplifier 51 an output signal of which is supplied to the coil position driving device 52. The electromagnetic coil 11 is driven in a direction of arrow 55 by the signal supplied from the power amplifier 51. In this manner, the electromagnetic coil 11 is driven in the direction of arrow 55 and follows a low frequency axial runout plane vibration of the magneto-optical disk 1.

Figure 6:
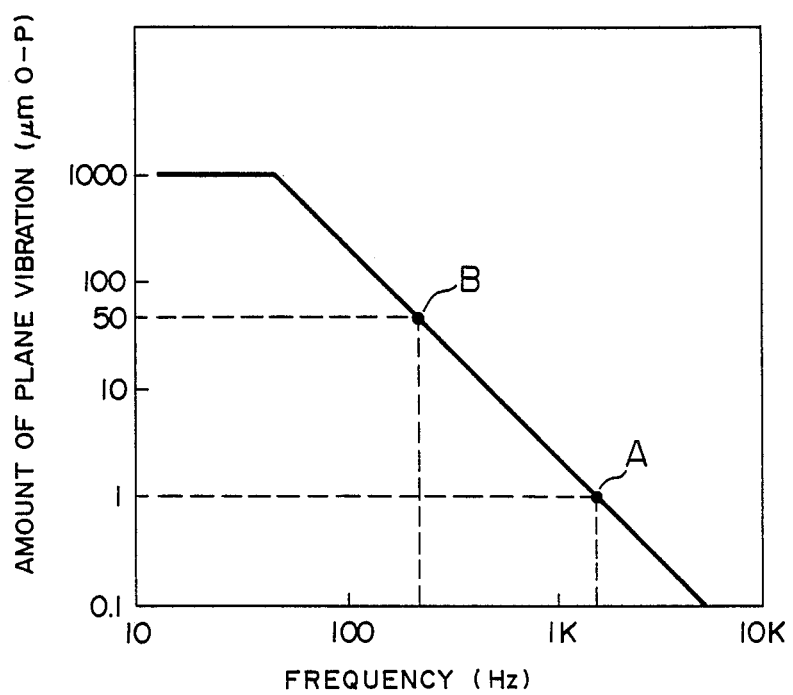
FIG. 6 shows an example of the frequency spectrum of the amount of axial runout of a general magneto-optical disk.

The reason why the low pass filter 60 is provided will now be explained by virtue of FIG. 6. FIG. 6 shows an example of a frequency spectrum of the amount of axial runout of the magneto-optical disk 1 during its rotation. As shown in FIG. 6, the axial runout amount of the magneto-optical disk 1 is 1000 $\mu m_{O-P}$ (or 1 $mm_{O-P}$) for frequencies lower than 50 Hz and has a tendency to decrease with the increase of the frequency.

It is required that the objective lens 10 follows such an axial runout with a precision of 1 $\mu m_{O-P}$ which is a focal depth. Accordingly, it is necessary that the objective lens 10 follows the axial runout of the magneto-optical disk 1 in a frequency range until a point A shown in FIG. 6.

On the other hand, a precision of 50-100 $\mu m_{O-P}$ suffices for the electromagnetic coil 11 to follow the plane of the magneto-optical disk 1, as has already been mentioned. Namely, it is only necessary that the electromagnetic coil 11 follows the axial runout of the magneto-optical disk 1 in a frequency range until a point B shown in FIG. 6. In other words, it is not necessary that the electromagnetic coil 11 follows the axial runout of the magneto-optical disk 1 in a range of frequencies higher than the frequency at the point B.

In the embodiment of FIG. 5, the low pass filter 60 is provided taking the above-mentioned teaching into consideration. The cut-off frequency of the low pass filter 60 is set to a frequency slightly higher that the frequency at the point B. Accordingly, the electromagnetic coil 11 is driven by the coil position driving device 52 in a low frequency range not higher than the frequency at the point B.

In the embodiment of FIG. 5, since the driving of the electromagnetic coil 11 is thus limited to low frequencies, there is an effect that the generation of high frequency noises attendant upon the driving operation of the coil position driving device 52 can be suppressed. Further, since the coil position driving device 52 is not driven at high frequencies, even a device generating higher orders of oscillatory resonances may be used as the coil position driving device 52. Furthermore, since there is not a fear that the coil position driving device 52 oscillates at high frequencies, the coil position driving device 52 can be constructed with a thin structure and a moving part of light weight. Therefore, the provision of high sensitivity and miniaturized size is possible with respect to the coil position driving device 52.

Figure 8:
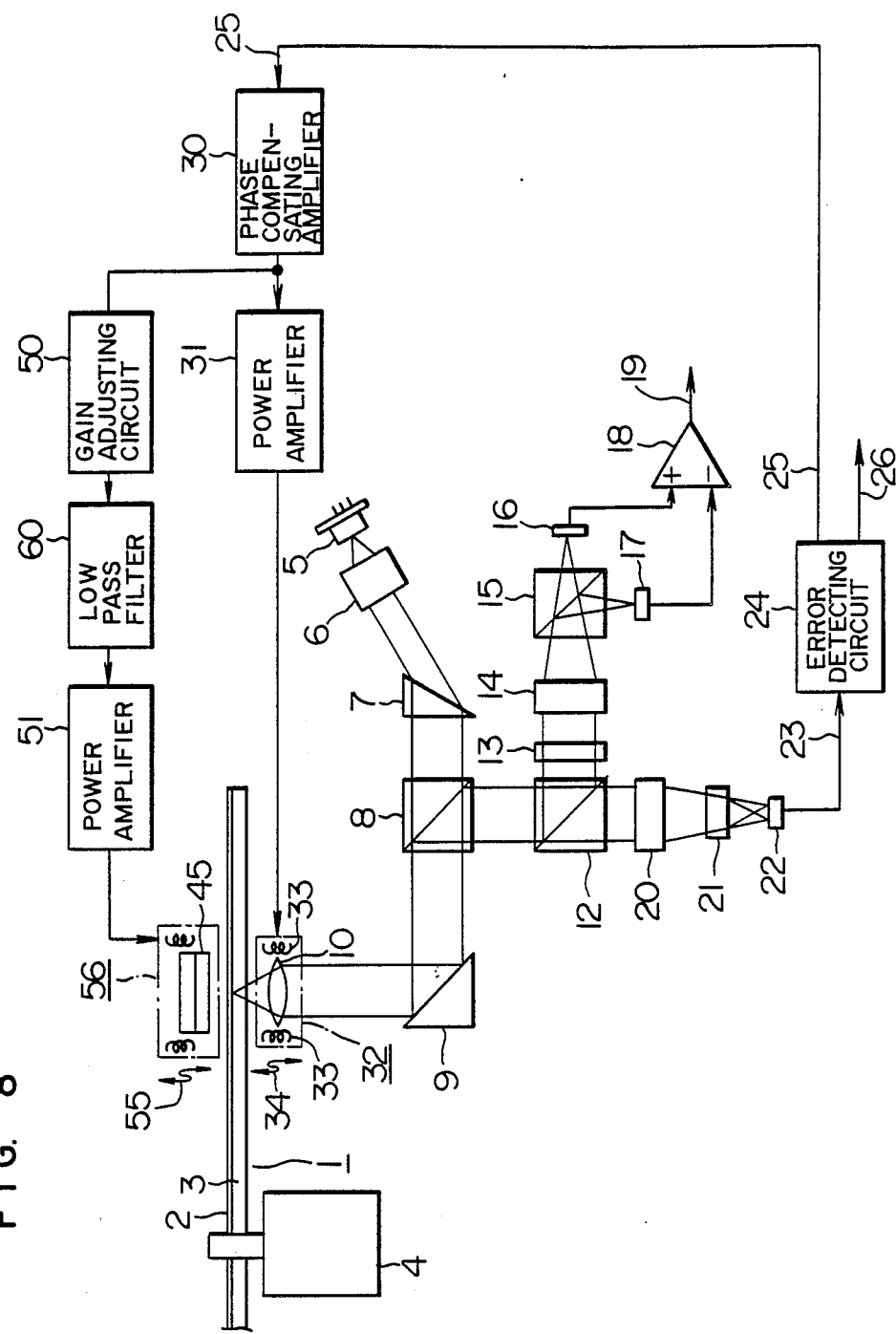
FIG. 8 shows a furthermore embodiment of the present invention.

Also for the embodiment shown in FIG. 5, the electromagnetic coil 11 may be replaced by a permanent magnet as in the embodiment shown in FIG. 7. FIG. 8 shows an embodiment in which a permanent magnet 45 is used. The magnet 45 is driven by a magnet position driving device 56. The other construction in the embodiment of FIG. 8 is the same as that in the embodiment of FIG. 5. Therefore, any further explanation will be omitted.

What is claimed is:

1. A magneto-optical recording and reproducing apparatus comprising:

a magneto-optical disk including a magnetic recording layer, an information signal being recorded as a change in the direction of magnetization of said magnetic recording layer;

radiation means including an objective lens for converging a laser beam to irradiate said optical magnetic disk;

focus error detecting means for detecting a change of a distance between said objective lens and said magneto-optical disk to produce a focus error signal;

objective lens driving means for generating an objective lens driving signal in accordance with said focus error signal to drive said objective lens so that it follows an axial runout of said magneto-optical disk in a direction of thickness thereof;

magnetic field generating means for applying a magnetic field to said magnetic recording layer; and magnetic field strength controlling means for receiving said objective lens driving signal generated from said objective lens driving means in accordance with said focus error signal to control said magnetic field generating means in accordance with said objective lens driving signal so that the strength of said magnetic field applied to said magnetic recording layer is kept constant in said magnetic recording layer irrespective of a change of a distance between said magneto-optical disk and said magnetic field generating means.

wherein said focus error detecting means includes light receiving means for receiving a reflected beam of the laser beam irradiated to said magneto-optical disk, and an error detecting circuit for producing said focus error signal in accordance with an output signal of said light receiving means, wherein said objective lens driving means includes a phase compensating amplifier applied with said focus error signal from said error detecting circuit, a first power amplifier applied with an output signal of said phase compensating amplifier, and an objective lens driving device for driving said objective lens in accordance with an output signal of said first power amplifier, and wherein said magnetic field generating means includes an electromagnetic coil, and said magnetic field strength controlling means includes an equalizer circuit applied with the output signal of said first power amplifier and a coil current controlling circuit applied with an output signal of said equalizer circuit for controlling a current to be supplied to said electromagnetic coil, thereby controlling the strength of said magnetic field.

2. A magneto-optical recording and reproducing apparatus comprising:

a magneto-optical disk including a magnetic recording layer, an information signal being recorded as a change in the direction of magnetization of said magnetic recording layer;

radiation means including an objective lens for converging a laser beam to irradiate said optical magnetic disk;

focus error detecting means for detecting a change of a distance between said objective lens and said magneto-optical disk to produce a focus error signal;

objective lens driving means for generating an objective lens driving signal in accordance with said focus error signal to drive said objective lens so that it follows an axial runout of said magneto-optical disk in a direction of thickness thereof;

magnetic field generating means for applying a magnetic field to said magnetic recording layer; and magnetic field strength controlling means for receiving said objective lens driving signal generated from said objective lens driving means in accordance with said focus error signal to control said magnetic field generating means in accordance with said objective lens driving signal so that the strength of said magnetic field applied to said magnetic recording layer is kept constant in said magnetic recording layer irrespective of a change of a distance between said magneto-optical disk and said magnetic field generating means.

wherein said focus error detecting means includes light receiving means for receiving a reflected beam of the laser beam irradiated to said magneto-optical disk, and an error detecting circuit for producing said focus error signal in accordance with an output signal of said light receiving means, wherein said objective lens driving means includes a phase compensating amplifier applied with said focus error signal from said error detecting circuit, a first power amplifier applied with an output signal of said phase compensating amplifier, and an objective lens driving device for driving said objective lens in accordance with an output signal of said first power amplifier, and wherein said magnetic field generating means includes an electromagnetic coil, and said magnetic field strength controlling means includes a gain adjusting circuit applied with the output signal of said compensating circuit, a second power amplifier applied with an output of said gain adjusting circuit, and a coil position driving device applied with an output signal of said second power amplifier for controlling a position of said electro-magnetic coil so that the strength of said magnetic field at said magnetic recording layer is kept constant.

3. A magneto-optical recording and reproducing apparatus comprising:

a magneto-optical disk including a magnetic recording layer, an information signal being recorded as a change in the direction of magnetization of said magnetic recording layer;

radiation means including an objective lens for converging a laser beam to irradiate said optical magnetic disk;

focus error detecting means for detecting a change of a distance between said objective lens and said magneto-optical disk to produce a focus error signal;

objective lens driving means for generating an objective lens driving signal in accordance with said focus error signal to drive said objective lens so that it follows an axial runout of said magneto-optical disk in a direction of thickness thereof;

magnetic field generating means for applying a magnetic field to said magnetic recording layer; and magnetic field strength controlling means for receiving said objective lens driving signal generated from said objective lens driving means in accordance with said focus error signal to control said magnetic field generating means in accordance with said objective lens driving signal so that the strength of said magnetic field applied to said magnetic recording layer is kept constant in said magnetic recording layer irrespective of a change of a distance between said magneto-optical disk and said magnetic field generating means, wherein said focus error detecting means includes light receiving means for receiving a reflected beam of the laser beam irradiated to said magneto-optical disk, and an error detecting circuit for producing said focus error signal in accordance with an output signal of said light receiving means, wherein said objective lens driving means includes a phase compensating amplifier applied with said focus error signal from said error detecting circuit, a first power amplifier applied with an output signal of said phase compensating amplifier, and an objective lens driving device for driving said objective lens in accordance with an output signal of said first power amplifier, and wherein said magnetic field generating means includes an electromagnetic coil, and said magnetic field strength controlling means includes a gain adjusting circuit applied with the output signal of said phase compensating circuit, a low pass filter applied with an output signal of said gain adjusting circuit, a second power amplifier applied with an output of said low pass filter, and a coil position driving device applied with an output signal of said second power amplifier for controlling a position of said electromagnetic coil so that the strength of said magnetic field at said magnetic recording layer is kept constant.

4. A magneto-optical recording and reproducing apparatus comprising:

a magneto-optical disk including a magnetic recording layer, an information signal being recorded as a change in the direction of magnetization of said magnetic recording layer;

radiation means including an objective lens for converging a laser beam to irradiate said optical magnetic disk;

focus error detecting means for detecting a change of a distance between said objective lens and said magneto-optical disk to produce a focus error signal;

objective lens driving means for generating an objective lens driving signal in accordance with said focus error signal to drive said objective lens so that it follows an axial runout of said magneto-optical disk in a direction of thickness thereof;

magnetic field generating means for applying a magnetic field to said magnetic recording layer; and magnetic field strength controlling means for receiving said objective lens driving signal generated from said objective lens driving means in accordance with said focus error signal to control said magnetic field generating means in accordance with said objective lens driving signal so that the strength of said magnetic field applied to said magnetic recording layer is kept constant in said magnetic recording layer irrespective of a change of a distance between said magneto-optical disk and said magnetic field generating means, wherein said magnetic field generating means includes a permanent magnet, and said magnetic field strength controlling means includes a magnet position driving device for controlling a position of said permanent magnet so that the strength of said magnetic field at said magnetic recording layer is kept constant.

5. A magneto-optical recording and reproducing apparatus comprising:

a magneto-optical disk including a magnetic recording layer, an information signal being recorded as a change in the direction of magnetization of said magnetic recording layer;

radiation means including an objective lens for converging a laser beam to irradiate said optical magnetic disk;

focus error detecting means for detecting a change of a distance between said objective lens and said magneto-optical disk to produce a focus error signal;

objective lens driving means for generating an objective lens driving signal in accordance with said focus error signal to drive said objective lens so that it follows an axial runout of said magneto-optical disk in a direction of thickness thereof;

magnetic field generating means for applying a magnetic field to said magnetic recording layer; and magnetic field strength controlling means for receiving said objective lens driving signal generated from said objective lens driving means in accordance with said focus error signal to control said magnetic field generating means in accordance with said objective lens driving signal so that the strength of said magnetic field applied to said magnetic recording layer is kept constant in said magnetic recording layer irrespective of a change of a distance between said magneto-optical disk and said magnetic field generating means, wherein said focus error detecting means includes light receiving means for receiving a reflected beam of the laser beam irradiated to said magneto-optical disk, and an error detecting circuit for producing said focus error signal in accordance with an output signal of said light receiving means, and wherein said magnetic field generating means includes a permanent magnet, and said magnetic field strength controlling means includes a magnet position driving device for controlling a position of said permanent magnet so that the strength of said magnetic field at said magnetic recording layer is kept constant.

6. A magneto-optical recording and reproducing apparatus comprising:

a magneto-optical disk including a magnetic recording layer, an information signal being recorded as a change in the direction of magnetization of said magnetic recording layer;

radiation means including an objective lens for converging a laser beam to irradiate said optical magnetic disk;

focus error detecting means for detecting a change of a distance between said objective lens and said magneto-optical disk to produce a focus error signal;

objective lens driving means for generating an objective lens driving signal in accordance with said focus error signal to drive said objective lens so that it follows an axial runout of said magneto-optical disk in a direction of thickness thereof;

magnetic field generating means for applying a magnetic field to said magnetic recording layer; and magnetic field strength controlling means for receiving said objective lens driving signal generated from said objective lens driving means in accordance with said focus error signal to control said magnetic field generating means in accordance with said objective lens driving signal so that the strength of said magnetic field applied to said magnetic recording layer is kept constant in said magnetic recording layer irrespective of a change of a distance between said magneto-optical disk and said magnetic field generating means.

wherein said focus error detecting means includes light receiving means for receiving a reflected beam of the laser beam irradiated to said magneto-optical disk, and an error detecting circuit for producing said focus error signal in accordance with an output signal of said light receiving means, wherein said objective lens driving means includes a phase compensating amplifier applied with said focus error signal from said error detecting circuit, a first power amplifier applied with an output signal of said phase compensating amplifier, and an objective lens driving device for driving said objective lens in accordance with an output signal of said first power amplifier, and wherein said magnetic field generating means includes a permanent magnet, and said magnetic field strength controlling means includes a gain adjusting circuit applied with the output signal of said phase compensating circuit, a second power amplifier applied with an output signal of said gain adjusting gain, and a magnet position driving device applied with an output signal of said second power amplifier for controlling a position of said permanent magnetic in accordance with the inputted signal so that the strength of said magnetic field at said magnetic recording layer is kept constant.

7. A magneto-optical recording and reproducing apparatus comprising:
- a magneto-optical disk including a magnetic recording layer, an information signal being recorded as a change in the direction of magnetization of said magnetic recording layer;
- radiation means including an objective lens for converging a laser beam to irradiate said optical magnetic disk;
- focus error detecting means for detecting a change of a distance between said objective lens and said magneto-optical disk to produce a focus error signal;
- objective lens driving means for generating an objective lens driving signal in accordance with said focus error signal to drive said objective lens so that it follows an axial runout of said magneto-optical disk in a direction of thickness thereof;
- magnetic field generating means for applying a magnetic field to said magnetic recording layer; and
- magnetic field strength controlling means for receiving said objective lens driving signal generated from said objective lens driving means in accordance with said focus error signal to control said magnetic field generating means in accordance with said objective lens driving signal so that the strength of said magnetic field applied to said magnetic recording layer is kept constant in said magnetic recording layer irrespective of a change of a distance between said magneto-optical disk and said magnetic field generating means,
- wherein said focus error detecting means includes light receiving means for receiving a reflected beam of the laser beam irradiated to said magneto-optical disk, and an error detecting circuit for producing said focus error signal in accordance with an output signal of said light receiving means,
- wherein said objective lens driving means includes a phase compensating amplifier applied with said focus error signal from said error detecting circuit, a first power amplifier applied with an output signal of said phase compensating amplifier, and an objective lens driving device for driving said objective lens in accordance with an output signal of said first power amplifier, and
- wherein said magnetic field generating means includes a permanent magnet, and said magnetic field strength controlling means includes a gain adjusting circuit applied with the output signal of said phase compensating circuit, a low pass filter applied with an output signal of said gain adjusting circuit, a second power amplifier applied with an output of said low pass filter, and a magnet position driving device applied with an output signal of said second power amplifier for controlling a position of said permanent magnet in accordance with the inputted signal so that the strength of said magnetic field at said magnetic recording layer is kept constant.

8. A magneto-optical recording and reproducing apparatus comprising:
- a magneto-optical disk including a magnetic recording layer, an information signal being recorded as a change in the direction of magnetization of said magnetic recording layer;
- radiation means including an objective lens for converging a laser beam to irradiate said optical magnetic disk;
- focus error detecting means for detecting a change of a distance between said objective lens and said magneto-optical disk to produce a focus error signal and including light receiving means for receiving a reflected beam of the laser beam irradiated to said magneto-optical disk and an error detecting circuit for producing said focus error signal in accordance with an output signal of said light receiving means;
- objective lens driving means having a phase compensating amplifier applied with said focus error signal from said error detecting circuit, a first power amplifier applied with an output signal of said phase compensating amplifier, and an objective lens driving device for driving said objective lens in accordance with an output signal of said first power amplifier and for generating an objective lens driving signal in accordance with said focus error signal to drive said objective lens so that it follows an axial runout of said magneto-optical disk in a direction of thickness thereof;
- magnetic field generating means for applying a magnetic field to said magnetic recording layer; and
- magnetic field strength controlling means for receiving said objective lens driving signal generated from said objective lens driving means in accordance with said focus error signal to control said magnetic field generating means in accordance with said objective lens driving signal so that the strength of said magnetic field applied to said magnetic recording layer is kept constant in said magnetic recording layer irrespective of a change of distance between said magneto-optical disk and said magnetic field generating means,
- wherein said magnetic field generating means includes an electromagnetic coil, and said magnetic field strength controlling means includes an equalizer circuit applied with the output signal of said first power amplifier and a coil current controlling circuit applied with an output signal of said equalizer for controlling a current to be supplied to said electromagnetic coil, thereby controlling the strength of said magnetic field.

9. A magneto-optical recording and reproducing apparatus comprising:
- a magneto-optical disk including a magnetic recording layer, an information signal being recorded as a change in the direction of magnetization of said magnetic recording layer;

radiation means including an objective lens for converging a laser beam to irradiate said optical magnetic disk;

focus error detecting means for detecting a change of a distance between said objective lens and said magneto-optical disk to produce a focus error signal and including light receiving means for receiving a reflected beam of the laser beam irradiated to said magneto-optical disk and an error detecting circuit for producing said focus error signal in accordance with an output signal of said light receiving means;

objective lens driving means having a phase compensating amplifier applied with said focus error signal from said error detecting circuit, a first power amplifier applied with an output signal of said phase compensating amplifier, and an objective lens driving device for driving said objective lens in accordance with an output signal of said first power amplifier and for generating an objective lens driving signal in accordance with said focus error signal to drive said objective lens so that it follows an axial runout of said magneto-optical disk in a direction of thickness thereof;

magnetic field generating means for applying a magnetic field to said magnetic recording layer; and magnetic field strength controlling means for receiving said objective lens driving signal generated from said objective lens driving means in accordance with said focus error signal to control signal magnetic field generating means in accordance with said objective lens driving signal so that the strength of said magnetic field applied to said magnetic recording layer is kept constant in said magnetic recording layer irrespective of a change of distance between said magneto-optical disk and said magnetic field generating means;

wherein said magnetic field generating means includes an electromagnetic coil, and said magnetic field strength controlling means includes a gain adjusting circuit applied with the output signal of said phase compensating circuit, a second power amplifier applied with an output of said gain adjusting circuit, and a coil position driving device applied with an output signal of said second power amplifier for controlling a position of said electromagnetic coil so that the strength of said magnetic of said magnetic recording layer is kept constant.

10. A magneto-optical recording and reproducing apparatus comprising:

a magneto-optical disk including a magnetic recording layer, an information signal being recorded as a change in the direction of magnetization of said magnetic recording layer;

radiation means including an objective lens for converging a laser beam to irradiate said optical magnetic disk;

focus error detecting means for detecting a change of a distance between said objective lens and said magnetic-optical disk to produce a focus error signal and including light receiving means for receiving a reflected beam of the laser beam irradiated to said magneto-optical disk and an error detecting circuit for producing said focus error signal in accordance with an output signal of said light receiving means;

objective lens driving means having a phase compensating amplifier applied with said focus error signal from said error detecting circuit, a first power amplifier applied with an output signal of said phase compensating amplifier, and an objective lens driving device for driving said objective lens in accordance with an output signal of said first power amplifier and for generating an objective lens driving signal in accordance with said focus error signal to drive said objective lens so that it follows an axial runout of said magneto-optical disk in a direction of thickness thereof;

magnetic field generating means for applying a magnetic field to said magnetic recording layer; and magnetic field strength controlling means for receiving said objective lens driving signal generated from said objective lens driving means in accordance with said focus error signal to control signal magnetic field generating means in accordance with said objective lens driving signal so that the strength of said magnetic field applied to said magnetic recording layer is kept constant in said magnetic recording layer irrespective of a change of distance between said magneto-optical disk and said magnetic field generating means;

wherein said magnetic field generating means includes an electromagnetic coil, and said magnetic field strength controlling means includes a gain adjusting circuit applied with the output signal of said phase compensating circuit, a low pass filter applied with an output signal of said gain adjusting circuit, a second power amplifier applied with and output of said low pass filter, and a coil position driving device applied with an output of said second amplifier for controlling a position of said electromagnetic coil so that the strength of said magnetic field at said magnetic recording layer is kept constant.

11. A magneto-optical recording and reproducing apparatus comprising:

a magneto-optical disk including a magnetic recording layer, an information signal being recorded as a change in the direction of magnetization of said magnetic recording layer;

radiation means including an objective lens for converging a laser beam to irradiate said optical magnetic disk;

focus error detecting means for detecting a change of a distance between said objective lens and said magneto-optical disk to produce a focus error signal and including light receiving means for receiving a reflected beam of the laser beam irradiated to said magneto-optical disk and an error detecting circuit for producing said focus error signal in accordance with an output signal of said light receiving means;

objective lens driving means having a phase compensating amplifier applied with said focus error signal from said error detecting circuit, a first power amplifier applied with an output signal of said phase compensating amplifier, and an objective lens driving device for driving said objective lens in accordance with an output signal of said first power amplifier and for generating an objective lens driving signal in accordance with said focus error signal to drive said objective lens so that it follows an axial runout of said magneto-optical disk in a direction of thickness thereof;

magnetic field generating means for applying a magnetic field to said magnetic recording layer; and magnetic field strength controlling means for receiving said objective lens driving signal generated from said objective lens driving means in accordance with said focus error signal to control signal magnetic field generating means in accordance with said objective lens driving signal so that the strength of said magnetic field applied to said magnetic recording layer is kept constant in said magnetic recording layer irrespective of a change of distance between said magneto-optical disk and said magnetic field generating means;

wherein said magnetic field generating means includes a permanent magnet, and said magnetic field strength controlling means includes a magnet position of said permanent magnet so that the strength of said magnetic field of said magnetic recording layer is kept constant.

12. A magneto-optical recording and reproducing apparatus comprising:

a magneto-optical disk including a magnetic recording layer, an information signal being recorded as a change in the direction of magnetization of said magnetic recording layer;

radiation means including an objective lens for converging a laser beam to irradiate said optical magnetic disk;

focus error detecting means for detecting a change of a distance between said objective lens and said magneto-optical disk to produce a focus error signal and including light receiving means for receiving a reflected beam of the laser beam irradiated to said magneto-optical disk and an error detecting circuit for producing said focus error signal in accordance with an output signal of said light receiving means;

objective lens driving means having a phase compensating amplifier applied with said focus error signal from said error detecting circuit, a first power amplifier applied with an output signal of said phase compensating amplifier, and an objective lens driving device for driving said objective lens in accordance with an output signal of said first power amplifier and for generating an objective lens driving signal in accordance with said focus error signal to drive said objective lens so that it follows an axial runout of said magneto-optical disk in a direction of thickness thereof;

magnetic field generating means for applying a magnetic field to said magnetic recording layer; and magnetic field strength controlling means for receiving said objective lens driving signal generated from said objective lens driving means in accordance with said focus error signal to control signal magnetic field generating means in accordance with said objective lens driving signal so that the strength of said magnetic field applied to said magnetic recording layer is kept constant in said magnetic recording layer irrespective of a change of distance between said magneto-optical disk and said magnetic field generating means;

wherein said magnetic field generating means includes a permanent magnet, and said magnetic field strength controlling means includes a gain adjusting circuit applied with the output signal of said phase compensating circuit, a second power amplifier applied with an output signal of said gain adjusting circuit, and a magnet position driving device applied with an output signal of said second power amplifier for controlling a position of said permanent magnet in accordance with an inputted signal so that the strength of said magnetic field at said magnetic recording layer is kept constant.

13. A magneto-optical recording and reproducing apparatus comprising:

a magneto-optical disk including a magnetic recording layer, an information signal being recorded as a change in the direction of magnetization of said magnetic recording layer;

radiation means including an objective lens for converging a laser beam to irradiate said optical magnetic disk;

focus error detecting means for detecting a change of a distance between said objective lens and said magneto-optical disk to produce a focus error signal and including light receiving means for receiving a reflected beam of the laser beam irradiated to said magneto-optical disk and an error detecting circuit for producing said focus error signal in accordance with an output signal of said light receiving means;

objective lens driving means having a phase compensating amplifier applied with said focus error signal from said error detecting circuit, a first power amplifier applied with an output signal of said phase compensating amplifier, and an objective lens driving device for driving said objective lens in accordance with an output signal of said first power amplifier and for generating an objective lens driving signal in accordance with said focus error signal to drive said objective lens so that it follows an axial runout of said magneto-optical disk in a direction of thickness thereof;

magnetic field generating means for applying a magnetic field to said magnetic recording layer; and magnetic field strength controlling means for receiving said objective lens driving signal generated from said objective lens driving means in accordance with said focus error signal to control signal magnetic field generating means in accordance with said objective lens driving signal so that the strength of said magnetic field applied to said magnetic recording layer is kept constant in said magnetic recording layer irrespective of a change of distance between said magneto-optical disk and said magnetic field generating means;

wherein said magnetic field generating means includes a permanent magnet, and said magnetic field strength controlling means includes a gain adjusting circuit applied with the output signal of said phase compensating circuit, a low pass filter applied with an output signal of said gain adjusting circuit, a second power amplifier for controlling a position of said permanent magnet in accordance with an inputted signal so that the strength of said magnetic field at said magnetic recording layer is kept constant.

* * * * *